United States Patent
Daggett

[11] 3,886,426
[45] May 27, 1975

[54] BATTERY SWITCHING CIRCUIT
[75] Inventor: Lester Alvin Daggett, Palos Verdes Peninsula, Calif.
[73] Assignee: Eagle-Picher Industries, Inc., Cincinnati, Ohio
[22] Filed: Mar. 16, 1973
[21] Appl. No.: 342,213

[52] U.S. Cl. .................. 320/7; 320/8; 320/16; 318/139
[51] Int. Cl. ...... H02j 7/00; H02p 7/00; H02p 7/20
[58] Field of Search ........... 320/13, 2, 7, 8, 15, 16; 318/139

[56] References Cited
UNITED STATES PATENTS

| | | | |
|---|---|---|---|
| 3,182,742 | 5/1965 | Dow | 318/139 |
| 3,207,966 | 9/1965 | Parkinson | 318/139 |
| 3,223,908 | 12/1965 | Hutchinson et al. | 318/139 |
| 3,249,836 | 5/1966 | Stamm | 318/139 X |
| 3,280,397 | 10/1966 | Bruns | 318/139 |
| 3,387,194 | 6/1968 | Banks | 318/139 |

*Primary Examiner*—J. D. Miller
*Assistant Examiner*—Robert J. Hickey
*Attorney, Agent, or Firm*—Wood, Herron & Evans; James S. Hight

[57] ABSTRACT

A battery interconnection control circuit for interconnecting a plurality of batteries in parallel, series-parallel, and series configuration is disclosed. The apparatus includes a plurality of batteries, each connected through a unidirectional current-conducting element such as a diode to a common positive lead. The negative terminal of all but one of these batteries is connected to a switch which permits the negative terminal to be connected either to a common negative lead or to the positive terminal of another battery. The remaining battery has its negative terminal connected directly to the common negative lead. The switches themselves are controlled by a cam to provide a switching sequence, as the cam moves from one position to another, to thereby provide varying voltages between the positive and the negative common leads.

5 Claims, 4 Drawing Figures

BATTERY SWITCHING CIRCUIT

This invention relates generally to means for improving the efficiency of operation of vehicles of the type which are powered by a plurality of batteries. More particularly, it relates to an improved battery switching system of the type whereby as the vehicle is started the batteries are progressively switched in increments from a parallel configuration through series-parallel connections to a series configuration, and vice versa.

The circuit of this invention is especially useful in vehicles such as battery powered golf carts and industrial trucks, in which an electric motor drive is powered by rechargeable (or "secondary") batteries.

The charge of the batteries on such vehicles of course diminishes with usage, so that after some quantum of use the batteries must be recharged. Typically it is the practice periodically to recharge the batteries at a recharging station, for example, overnight or at the end of a use period. The charging operation often requires several hours, during which the vehicle is not available for use.

It is of course desirable to obtain the maximum or most efficient utilization of the charge of all the batteries so that a given vehicle can be driven a relatively large distance between recharging and the recharging stop can be held to a minimum. A main objective of this invention has, therefore, been to improve the efficiency of utilization of battery charge, so as to enable the vehicle powered by the batteries to provide a higher quantum of useful output energy or, in other words, to be capable of being driven farther on the same charge.

It is known in the art that at the start of rotation of an electric motor, the motor draws a substantially higher current (amperage) load than when it is operating at rated speed, and that as motor speed increases, the ampere draw is reduced and it is desirable to provide higher operating voltage. It is also known that by reason of this characteristic change in the amperage-voltage requirements of the motor, it is desirable initially to connect batteries driving the motor in parallel with one another, to provide maximum amperage for motor start and thereafter, as motor speed increases, to change the battery connections so that the batteries are gradually switched to series connection, thereby to provide maximum voltage for top speed operation.

Systems for effecting such changes in battery interconnections to accompany motor operating changes are shown in several early U.S. Pat., including Nos. 433,360; 455,019; 621,285; 626,798 and 632,874.

The earlier switching systems noted above utilized mechanical contacts to establish sequential battery reconnections. More recently, diodes and rectifiers have been used, for example as shown in U.S. Pat. No. 3,168,688, which teaches the use of diodes to prevent short circuiting of batteries in their various switched configurations. The inefficiency of controlling the voltage applied to a DC motor by series resistors is taught in U.S. patent No. 3,207,966, in which diodes are used to prevent short circuits. That patent teaches a means for shunting a portion of the battery current around a motor field winding when the batteries are connected in series, in order to give a different voltage.

Banks Pat. No. 3,387,194 shows a circuit in which a plurality of batteries are connected in parallel between two buses, and a diode is connected between each respective battery and the positive bus. Additionally, some of the batteries include a diode in the negative lead. A cam operated switch is connected between the negative terminal of each battery and the positive terminal of an adjacent battery. This connection also includes a resistor in series between the positive terminal of one battery and the negative terminal of the connected battery. The switches are closed in a sequence of combinations which will permit voltage applied to the motor to increase in steps equal to the terminal voltage of each battery. As shown hereinafter, the control circuit efficiency for each circuit shown by Banks is rather poor, by reason of diode and resistor losses.

In accordance with this invention it is a primary objective to provide a battery interconnection control circuit that is not subject to high control circuit losses.

It is a further objective of the invention to provide an interconnection control circuit which balances the current drain from each battery thereby permitting a golf cart, for example, powered thereby to travel a further distance than can be traveled by prior art carts with the same number of batteries.

To achieve these and other objectives of this invention, a battery interconnection circuit is provided for sequentially interconnecting a plurality of batteries in a manner which permits the load voltage to be varied while the current drain on each of the batteries is maintained substantially at a constant level for each battery. The positive terminal of each such battery is connected through a unidirectional current conducting element such as a diode to a common positive lead. Each negative terminal of each battery is connected by a switch to either a corresponding input terminal or to the common negative lead. All but one of the input terminals associated with a battery are connected to the positive terminal of another battery. A further battery is connected with its negative terminal wired to the common negative lead and its positive terminal connected through a unidirectional current-conducting element to the common positive lead. This additional battery has its positive terminal also connected directly by wire to the unconnected input terminal. By controlling the sequence of switch closure, the batteries can be wired in various combinations of parallel, series-parallel, and completely series connections to thereby provide a plurality of output voltages to the common positive and common negative leads. A circular cam is preferably provided to control the sequence of switch closure to thereby adjust the output voltage on the common lead in incremental fashion and also maintain a substantially uniform discharge rate amongst all of the circuit batteries.

The foregoing and other objects, advantages, and features of this invention will become more clear from the following detailed description of a preferred embodiment therefor taken in connection with the drawings which form a part of the original disclosure wherein.

DETAILED DESCRIPTION

Figure 1:
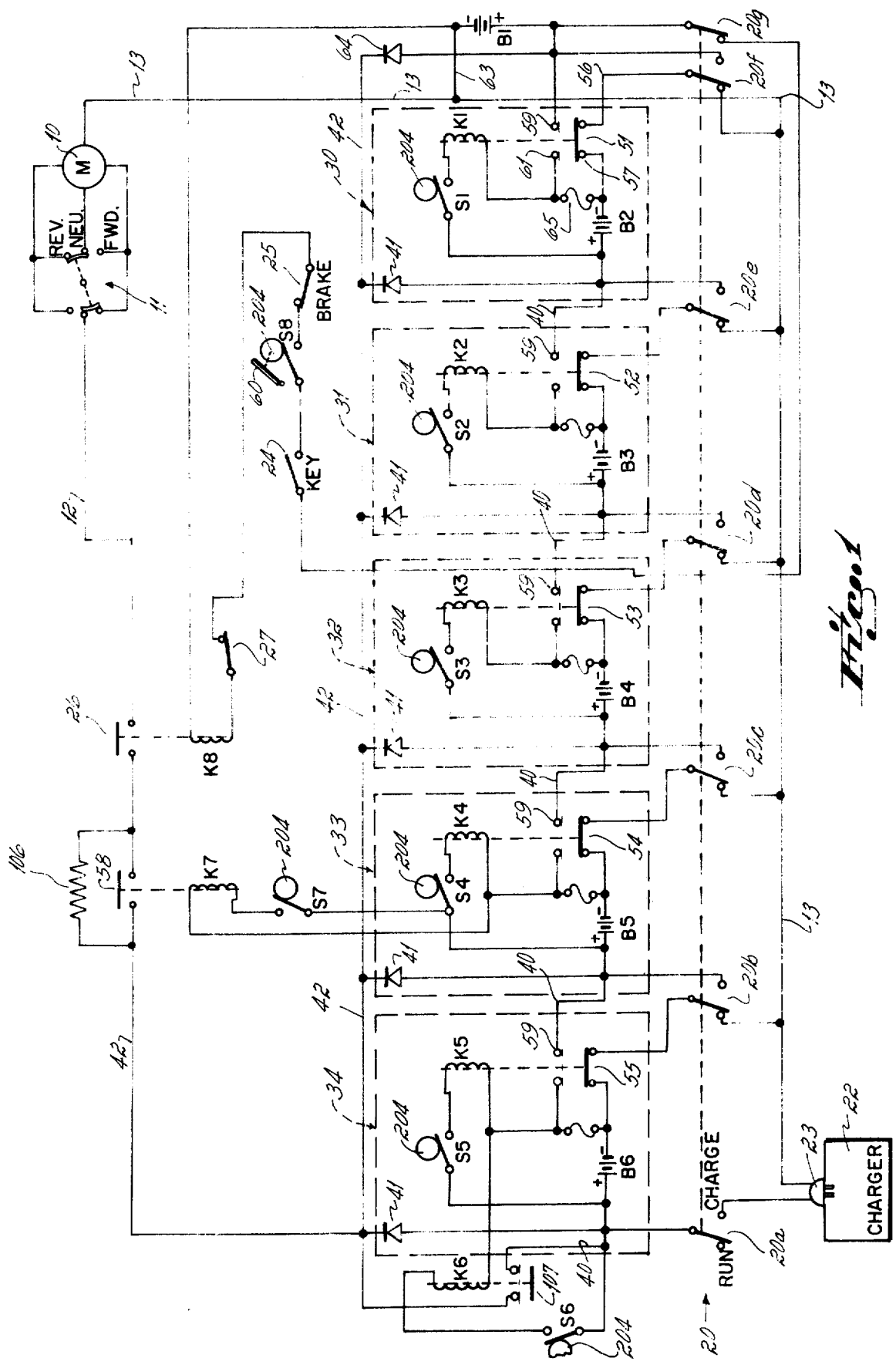
FIG. 1 is an electrical circuit diagram for the battery interconnection circuit of this invention.

Referring now to FIG. 1, a detailed electrical circuit is shown, for the motor speed control of the present invention which is particularly adapted for use in golf carts or the like. The circuit includes a motor 10 for powering the golf cart or other vehicle. This motor 10 normally comprises a DC motor having a sufficient horsepower rating to propel the vehicle when fully loaded with riders and golf bags. Connected to the motor 10 is a forward-reverse switch 11 for controlling the direction of rotation of the motor 10 by controlling the direction of current flow through the motor armature. Switch 11 includes three switching positions, forward, neutral and reverse position. In the position shown in FIG. 1, the forward-reverse switch 11 is in its reverse position. By turning the switch 11 in a clockwise direction, however, the direction of current flow through the armature of the motor can be reversed, and thereby causing the direction of motor rotation to reverse. Motor 10 and switch 11 may be conventional and are described herein merely by way of example, and do not thereby comprise the invention. Other DC motor connections and electrical switching for controlling the direction of the motor rotation may be employed.

The remainder of the circuit shown in FIG. 1 is an apparatus for providing on wires 12 and 13 a DC electrical signal having an amplitude which is determined by the switch configuration in the remainder of the network of FIG. 1. The battery interconnection control circuit, which comprises the remainder of FIG. 1, provides a positive voltage at wire 12 with respect to the voltage at wire 13 having a variable magnitude for controlling the speed of the motor 10. In accordance with the foregoing description of this invention, the voltage appearing between lines 12 and 13 may be varied from 0 volts to 36 volts in step-like increments. Furthermore, as hereinafter described in greater detail, the battery interconnection control circuit of FIG. 1 is operative not only to change the voltage between the wires 12 and 13 but also operative to balance the current drain from each battery so that all the batteries in the circuit are discharged at substantially the same rate.

In connection with the operation of the motor 10, the battery interconnection control circuit in FIG. 1 includes a plurality of switches used to control the circuit operation, but that do not themselves actually interconnect the batteries during normal operation of the circuit. The 7-pole double throw switch 20 (the poles of which are designated 20a-2g respectively) controls whether the circuit will be operational for providing power to the motor 10, or whether the circuit operates to charge the chargeable storage batteries B1-B6 therein. In the position as shown, the switch 20 is in its run position, thereby permitting other control switches in the circuit to be described, to connect the batteries B1-B6 to power the motor 10. When the switch 20 is thrown to the other or charge position, the network is switched to permit the batteries B1-B6 to be charged by a conventional charger shown diagrammatically at 22. When the circuit of FIG. 1 is used to control a golf cart or other vehicle, the charger 22 is advantageously disconnectable from the golf cart. This is most easily accomplished by having a plug 23 connected electrically to the control circuit which engages a socket on the charger 22 whenever the batteries need charging.

When the switches 20a-g are thrown to their "charge" positions, all of the batteries B1 through B6 can be charged because the batteries become series connected between the positive and the negative terminals of charger 22. This series connection starts at the positive terminal of the charger 22 and passes through the switch 20a to the positive terminal of battery B6. Then the circuit goes through the relay contacts 55 to switch 20b and then on to the positive terminal of battery B5. The circuit continues in similar manner through batteries B4, B3 and B2 to switch 20f. Then the circuit continues to the positive terminal of the battery B1. From the negative terminal of the battery B1 the wire 63 connects directly to the common negative lead 13 which in turn is connected to the negative terminal of the charger 22 via the plug 23. As such, a charging current from the charger 22 will pass through all of the batteries B1-B6 to recharge these batteries in conventional manner.

In addition to the foregoing, two other switches are provided for controlling the battery interconnection control circuit. The first of these switches is a key operated master or ignition switch 24 which is shown in its open position. When the switch 24 is closed, however, the circuit may be operated to power the motor 10, depending upon the setting of the remainder of the switches in the network. This master switch 24 is normally located on the vehicle console and is manually turned to its closed position when the operator desires to operate the vehicle. The second switch is the brake switch 25 which is shown in the brake off position. Whenever the safety brake on the vehicle is set, the brake switch 25 is changed from the closed circuit position shown to its open circuit position, thereby preventing operation of the circuit whenever the safety brake is engaged by preventing current from flowing through the K8 relay which controls contactor 26 and thereby controlling the electrical signal applied to the wire 12.

A forward-reverse interlock switch 27 is shown in FIG. 1 in its normal closed circuit position. However, this switch 27 will change to its open circuit position whenever the forward-reverse switch 11 is being changed from one position to another. This interlock switch 27 prevents the contactor 26 from being closed whenever the forward-reverse switch 11 is being changed. The forward-reverse switch 11 thus cannot arc during switching thereof, because the supply voltage is removed from wire 12 by the opening of contactor 26 whenever the forward-reverse switch 11 is turned.

The remainder of the circuit shown in FIG. 1 is that portion of the circuit actually responsible for controlling the battery interconnection, thereby controlling the speed of motor 10.

Whenever the battery interconnection control circuit shown in FIG. 1 is conditioned to provide power to the motor 10, the switches 20 will be disposed in their run position as shown in FIG. 1. In addition, the switch 24 will be closed and the interlock switch 27 will be in the position as shown. In that condition, no current flows through relay K8 and the contactor 26 will remain in its normally open position as shown until such time as the microswitch S8 is activated. The microswitch S8 is activated by depressing the vehicle accelerator pedal 60 downwardly from its rest position.

Figure 3:
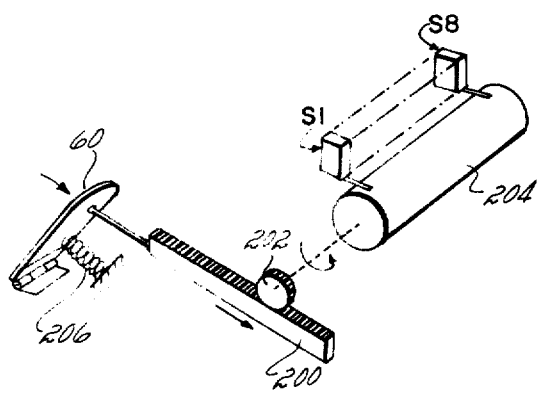
FIG. 3 is a schematic for an accelerator assembly for controlling the switching configuration.

The battery interconnection control circuit in FIG. 1 includes a plurality of microswitches S1-S8, each of which is controlled by a cam 204 that in turn is responsive to the position of accelerator pedal 60. This accelerator pedal 60 is like that found on a typical motor vehicle. Referring now to FIG. 3, when the pedal 60 is depressed, it moves, for example, a movable rack gear 200 which engages a fixed pinion gear 202. The cam 204 is connected to the pinion gear so that depressing the accelerator pedal 60 is operative to rotate the cam 204. A spring 206 is provided to return the accelerator to its rest position when the driver lifts his foot from the accelerator pedal 60. The structure of FIG. 3, however, does not attempt to describe all possible accelerator pedal configurations but merely shows diagrammatically one possible configuration therefor.

The cam 204, as hereinafter described in greater detail, is operative to control the sequence of closure for the switches S1-S8, and thereby to control the sequential interconnection of the batteries B1-B6 to the motor 10. The actual sequence of microswitch closure will be hereinafter described in greater detail. However, it is clearly advantageous to select a switching sequence which will maintain an even current drain on all the circuit batteries. It is also most advantageous to provide a switching sequence which provides steps in voltage from one amplitude to another which are not too large in value. That is, it is advantageous to vary the voltage from 0 to 36 volts, for example, in 6 volt increments. As will become clear later, this does not permit uniform discharging of the batteries and for the preferred embodiment of the present invention, this feature is not completely utilized. It will also be clear to those of skill in the art that the incremental steps need not be uniform in magnitude to practice the present invention.

The battery interconnection control circuit in FIG. 1 includes a plurality of batteries B1-B6, each of which may suitably be a 6 volt rechargeable storage cell of the type used in automobiles or electrically powered vehicles such as golf carts and the like. In its preferred aspect, as the accelerator pedal is depressed from its rest position downwardly to its fully depressed position the battery interconnection control circuit is operative to progressively interconnect the batteries B1-B6 first in parallel, then in series-parallel and finally in series connection to thereby provide a voltage varying between 0 and 36 volts in incremental steps to the motor 10. The battery interconnection control circuit is operative to connect each of the batteries B1-B6 in series for maximum speed - high power operation. In parallel, the batteries shown supply a 6 volt output, with low amperage. For voltages in between these two extremes, various combinations of series-parallel connections are made by the battery interconnection control circuit.

The battery interconnection control circuit includes a plurality of substantially identical circuit modules shown generally within the dotted lines 30, 31, 32, 33 and 34. Each of these circuits modules 30–34 include a battery, namely the batteries B2-B6. The positive lead of each of these batteries is connected to an output wire 40. The positive terminal of each battery B2-B6 is also connected in circuit with a diode 41 to a common electrical conducting bus 42. Each diode 41 is connected as shown to permit current to flow from the connected positive terminal of a battery to the common bus 42, but not in the reverse direction.

Each circuit module 30-34 also includes a microswitch S1, S2, S3, S4 and S5 respectively, which is also connected to the positive terminal of the corresponding battery B2, B3, B4, B5 and B6 respectively. Each microswitch S1-S5, as will be described later, is a normally open circuited switch, and is closed by contact with the cams connected to the vehicle accelerator pedal. Each such switch S1-S5 controls energization of the relay coils K1, K2, K3, K4, and K5 respectively. The relay coils K1-K5 are connected in circuit between the normally open contact of the microswitches S1-S5 respectively and the negative terminal of each of the batteries B2-B6 respectively. As such, each of the microswitches S1-S5, upon closing, complete an electrical circuit causing current to conduct through relay coils K1-K5 respectively.

When current flows through any of relay coils K1-K5, the associated relay contactors 51, 52, 53, 54, and 55 will change from the position indicated in FIG. 1 to that indicated by the dotted lines. By way of example, when the relay K1 is not conducting, the input wire 56 is connected by the contactor 51 to a terminal 57 which in turn is connected to the negative lead of the battery B2. The input wire 56 is connected through switch 20f to the negative power lead 13 connected to the motor 10. The positive lead from the battery B2 is connected by the diode 41 to the common bus 42. Assuming, for the time being, that the relays K7 and K8 are conducting, and that contactors 58 and 26 are both closed, the switch setting shown in FIG. 1 for the module inside the dotted line 30 permits this module to connect the positive lead of the battery B2 via a unidirectional current conductivity element such as diode 41 to the common positive lead 42 and then to the positive input wire 12 through contactors 58 and 26. The negative terminal of the battery B2 is connected via the contactor 51, wire 56, and switch 20f to the negative input wire 13. In fact, the setting for the various microswitches shown in FIG. 1 (assuming that contactors 58 and 26 are closed) is operative to connect the batteries B2, B3, B4, B5 and B6 in parallel and thereby connect the positive leads of each of these batteries via the common positive lead 42 to the positive input wire 12 and the negative leads of each of these batteries to the common negative lead 13. As such, five of the six batteries shown in FIG. 1 are connected in parallel. The battery B1 is also connected in parallel with the remaining batteries because the negative lead thereof is connected directly by a wire 63 to the negative lead 13 and the positive lead of the battery B1 is connected through a diode 64 to the common bus 42 thereby connecting the battery B1 in parallel with the remaining batteries for the setting shown of the contactors 51-55.

Each of the modules 30-34 include microswitches S1-S5 for changing the contactor 51-55 respectively. By so doing, the circuit configuration is altered thereby to change the voltage applied across the input wires 12 and 13 and thereby control the speed of motor 10. By way of example, when microswitch S1 is closed, a current will flow through the relay coil K1 to cause the contactor 51 to change from the position indicated to its dotted position as shown in FIG. 1 wherein the input wire 56 is disconnected from the terminal 57 and the input terminal 59 is connected to the terminal 61. In this condition, the positive terminal of the battery B1 is connected via the input terminal 59 to the terminal 61. From the terminal 61, an electrical connection is provided through a fuse 65 to the negative terminal to the battery B2. Thus, by closing the microswitch S1, the battery B1 and the battery B2 are connected in series thereby producing at the common bus 42 a signal which is the sum of their individual voltages (12 volts) higher than the potential at the common negative lead 13. This 12 volt signal is operative to reverse bias the diode 64, and the diodes 41 in each of the modules 31, 32, 33 and 34. By way of this example, it can readily be seen that the switches S1, S2, S3, S4, and S5 are operative to change the contactor 51, 52, 53, 54 and 55 respectively thereby causing the batteries B2, B3, B4, B5 and B6 to be connected in series with the electrical signal appearing at the input terminal 59 to each module.

Figure 2A:
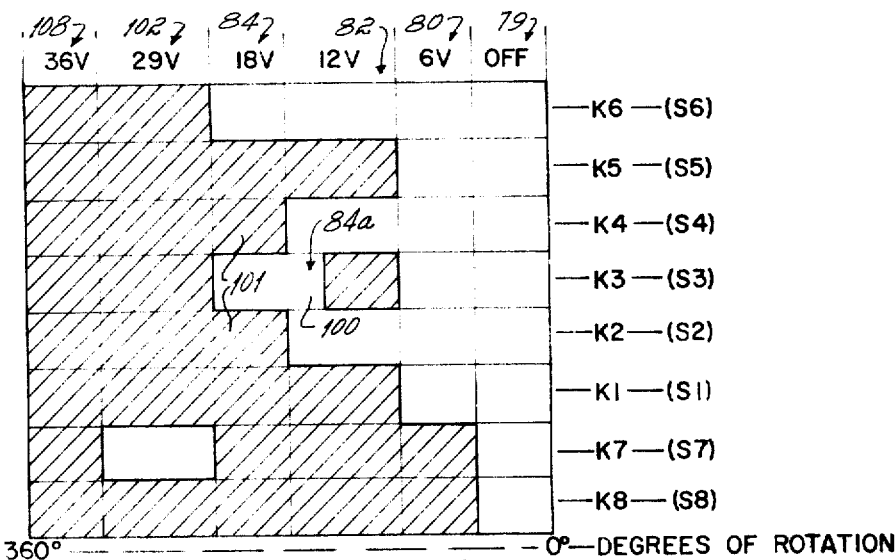
FIG. 2a shows schematically the circuits of the control cam.
Figure 2B:
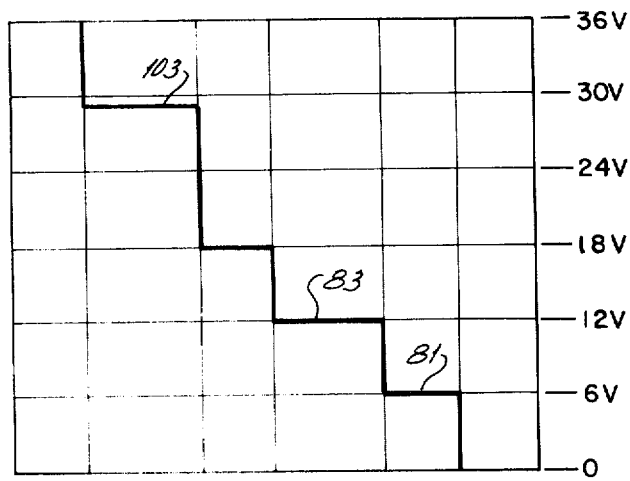
FIG. 2b shows the corresponding output voltage at the common leads for corresponding cam shaft rotations.

The detailed operation of the circuitry shown in FIG. 1 is best described with specific reference to the control cam shown diagrammatically in FIG. 2a and the voltage at the bus 12 which is shown in FIG. 2b for the different cam positions shown in FIG. 2a. The cam diagram of FIG. 2a is a schematic representation of the surface of the cam. The unshaded areas correspond to "low" areas on the cam surface which do not contact a microswitch. The shaded areas, however, correspond to "high" areas on the cam surface which project outwardly to contact one of the microswitches to cause closure thereof. The cam itself is arranged so that vertical columns in FIG. 2a correspond to regions of constant angular rotation of the cam. When the cam is arranged so that none of the microswitches S1-S8 are closed, as shown generally in FIG. 2a at 79, the voltage appearing at the common bus 12 is 0 volts because the contactor 26 is open. When the vehicle accelerator is depressed, the cam is rotated as described earlier for one possible accelerator pedal assembly, to a position where only microswitches S7 and S8 are closed, as indicated generally in FIG. 2a at 80, to thereby cause current to conduct through the relays K7 and K8 thereby causing the contactors 26 and 58 to close. When this condition occurs, as indicated earlier, all of the batteries B1-B6 are connected in parallel by the remainder of the network and a 6 volt signal from the common bus 42 is applied through the contactors 58 and 26 to the positive input lead 12 as indicated at 81 in FIG. 2b. In this switching condition, the battery interconnection control circuit has each of the six batteries B1-B6 connected in parallel to thereby distribute the load current drawn by motor 10 evenly between all of the batteries B1-B6. In this switching configuration all of the batteries will be discharged at the same rate.

As the accelerator is further depressed, the cam rotates as described earlier until the microswitches S1, S3 and S5 are also depressed by the cam lobe or portion shown diagrammatically in FIG. 2 at 82. In this switching configuration, as indicated in FIG. 2b at 83, the voltage applied to the motor 10 is 12 volts. This 12 volt configuration is achieved by interconnecting the batteries B1-B6 so that there are three parallel connected sets of two series connected 6 volt batteries. This result is achieved by closing the microswitches S1, S3, S5, S7 and S8. When these microswitches are closed, the relays K1, K3, K5, K7 and K8 are conducting, thereby changing the contactors 51, 53, 55, 58 and 26 from the position indicated in FIG. 1 to their other position. When this occurs the battery B1, as described earlier, is connected in series with the battery B2. In similar manner, the batteries B3 and B4 are series connected as are the batteries B5 and B6. As a consequence, the voltage at the common bus 42 is 12 volts as indicated in FIG. 2b at 83 which is produced by the parallel connection of series connected battery pairs of B1-B2, B3-B4 and B5-B6.

In order to produce a signal at 18 volts, the cam is rotated to the position shown generally as 84 so that two sets of three series connected batteries are connected in parallel between the common bus 42 and the negative bus 13. The switching from the 12 volt to the 18 volt state is advantageously accomplished by first opening the S3 microswitch. This is accomplished by the cam at point 100 where the microswitch S3 is opened. In this condition the battery interconnection control circuit in FIG. 1 produces a 12 volt signal at the common bus 42 entirely through the series combination of batteries B5 and B6 parallel connected with the series connection of batteries B1 and B2. The batteries B3 and B4 are temporarily removed from the system.

Upon further rotation of the cam, however, the microswitches S2 and S4 are closed as indicated generally at 101 in FIG. 2a. By closing the switches S2 and S4 in combination with the already closed switches S1, S5, S7 and S8, the contactors in FIG. 1 are arranged so that batteries B1, B2 and B3 are connected in series between the common bus 42 and the negative bus 13. In a similar manner, the batteries B4, B5, B6 are also connected in series between the common bus 42 and the negative bus 13. In this switching configuration, the voltage at the common bus 42 is 18 volts.

Since one of the prime objectives of this invention is to achieve a uniform discharging of all of the batteries during the operation of a battery powered vehicle, it is desirable to provide a switching network which connects all of the batteries at each output voltage in a manner so that the load current is shared equally by all the batteries. As a consequence whenever less than all of the batteries are connected while the accelerator is depressed, the angular displacement associated with that condition is advantageously kept small in order that the connected batteries for such configuration will not be discharged a great deal more than the unconnected batteries. For this reason, the rotary displacement of the cam is kept small for the configuration shown generally at 84a to prevent uneven discharge of batteries when the switching configuration is changed from 12 to 18 volts.

In order further to increase the available voltage to the motor, the switching configuration is changed from that indicated for an 18 volt output signal on line 12 to that shown generally at 102 in FIG 2a. The voltage which corresponds to this switching configuration is shown generally at 103 in FIG. 2b and is approximately 29 volts in the preferred embodiment. For the switching configuration shown generally at 102, all the switches S1-S6 and S8 are closed while the switch S7 is open. As such, all of the batteries B1-B6 are connected in series to produce a 36 volt potential on the common bus 42. Since S7 is open, however, the relay K7 does not conduct and the associated contactor 58 is opencircuited as shown in FIG. 1. This means that the resistor 106 in series connected between the wire 12 and the common bus 42 to thereby provide a voltage drop across the resistor 106 to reduce the voltage at the input to the motor 10. In the preferred embodiment of this invention, the resistor 106 is selected to have a resistance wherein the voltage drop across the resistor 106 for normal operating conditions of the motor 10 is approximately 7 volts so that the voltage appearing on the wire 12 is approximately 29 volts. In this switching configuration, like all other previously described switching configurations with the exception of the transitional configuration shown generally at 84a, all of the batteries are connected so as to be discharged at a uniform rate because in this switching configuration all batteries are series connected.

In order to further increase the voltage at the input to the motor, the resistor 106 is removed from the circuit by again closing the microswitch S7, as indicated generally at 108 in FIG. 2a. In this switching configuration, all of the switches S1-S8 are closed and the voltage appearing at the wire 12 is 36 volts, the voltage for all of the six batteries B1-B8 when series connected.

A further system feature is indicated generally at 102 in FIG. 2a wherein the microswitch S6 closes. Upon closure of the microswitch S6, the relay K6 will conduct causing the contactor 107 to short circuit the output lead 40 from the module 34 to the common bus 42. As such, the diode 41 in the module 34 is short circuited and the finite voltage drop caused by current flow through this diode is eliminated thereby increasing slightly the voltage at the common bus 42.

When the accelerator pedal is raised, the interconnection sequence, as outlined above will reverse itself as the cam connected thereto is rotated in the opposite direction, thus permitting the voltage supplied to the motor to fall from 36 to 0 volts in incremental step while maintaining the generally even load current distribution amongst all the batteries.

As indicated earlier, one of the principal advantages of the present invention is that it provides a significant increase in control circuit efficiency as compared to the circuitry in the Banks patent. The term control circuit efficiency relates to the percentage of power available to operate the motor as compared to the total power delivered by the batteries. The approximate control circuit efficiency can be calculated by the following equation:

$$\left( \frac{I_A V_B - \left(\frac{I_A}{n} V_D n\right) - I_A^2 R}{I_A V_B} \right) 100 = \% \text{ Efficiency of the Control Circuit}$$

$I_A$ = Armature Current in Amperes
$V_B$ = Battery Voltage Under Load at Each Speed
R = Resistance in ohms of Element 106 of FIG. 1, R Becomes 0 ohms When Element 58 is Closed.
n = Number of Diodes in Conduction, in Parallel at Each Speed
$V_D$ = Voltage Drop Across a Power Diode in Conduction For calculational simplicity, it is assumed that $I_A$ is 50 amperes at all speeds, $V_B$ is 6 volts for each battery, R is assumed to be 0.12 ohms, and $V_D$ is typically 1 volt. The calculations of approximately control circuit efficiency disregard the minor losses due to contactor coil current and wire losses. By using the above equation and assumptions, the approximate control circuit efficiency has been calculated for each speed. The results of these calculations are shown below in Table I.

On the other hand, the approximate efficiency of the control circuit shown in FIG. 5 of the Banks patent would be calculated by the following equation.

$$\left( \frac{I_A V_B - I_A V_D n}{I_A V_B} \right) 100 = \% \text{ Efficiency}$$

$I_A$ = Armature Current in Amperes
$V_B$ = Battery Voltage Under Load at Each Speed
$V_D$ = Voltage Drop Across a Power Diode in Conduction
n = Number of Diodes in Conduction in Series at Each Speed The same typical armature current and battery voltage assumptions used to calculate the approximate control circuit efficiency of this invention were used to calculate the approximate control circuit efficiency of the Banks circuit. The results of these calculations are also shown in Table I.

TABLE I

| Speed | Banks | This Invention |
|-------|-------|----------------|
| 1st | 16-2/3% | 83-1/3% |
| 2nd | 66-2/3% | 91-2/3% |
| 3rd | 83-1/3% | 94-4/9% |
| 4th | 91-2/3% | 83-1/3% |
| 5th | 96-2/3% | 100% |
| 6th | 100% | |
|  | 75.83% | 90.55% Average |

As can be seen from Table 1, the present invention has approximate control circuit efficiencies which are very significantly higher than for the approximate efficiencies of the circuitry shown by Banks with the exception of the 4th speed, wherein the present control circuit efficiency is slightly less than that of Banks at a comparable speed. In the total picture, however, the present invention is far more efficient that that of Banks because the control circuit uses less power for the first three speeds than does the Banks circuit. In fact, the average efficiency of this invention is 90.55 percent while that of Banks is only 75.83 percent. This difference is due generally to the fact that Banks includes more electrical elements in series with the batteries for most circuit configurations thereby causing more control circuit losses. Because of the increased overall efficiency of the present invention, the batteries are not discharged at as rapid a rate as they are in the Banks circuit and, consequently, battery powered vehicles controlled by control circuits of the present invention can travel a further distance than vehicles controlled by the Banks circuit, while consuming the same amount of electrical power.

While the foregoing description has been made with particular emphasis on a preferred embodiment therefor, it will be recognized by those of skill in the art that certain modifications in form only can be made without departing from the spirit and scope of this invention. Specifically, certain modifications to the cam may be made to provide slightly different switching sequences to thereby produce, for example, an output voltage at 24 volts. By providing such a switching sequence, it is possible to change the voltage from 0 to 36 volts in 6 volt steps, although, by so doing, some of the batteries in a 6 volt system like that described in FIG. 1, are discharged at slightly different rates because not all of the batteries are used in the 24 volt switching configuration.

The invention has been described with particular emphasis on the preferred circuit configuration, however, those of skill in the art will readily recognize other equivalent circuits. For example, the polarity of the batteries can be reversed and a corresponding change in the orientation of the diodes made to provide an identical circuit producing a signal at the common leads with reverse polarity from that of the preferred circuit.

It will further be recognized by those of skill in the art that the present invention may be adapted to systems having a greater or lesser number of batteries and associated switching circuitry to thereby provide other control networks employing the principles of this invention to produce control circuits providing output voltages with different voltage increments. These and other changes in form only may be readily made by those of skill in the art without departing from the spirit and scope of this invention as defined by the following claims.

What is claimed is:

1. A battery interconnection circuit for applying different voltages from a plurality of batteries across a load while maintaining substantially uniform current drain from the batteries, comprising, in combination:
   a common positive lead and a common negative lead with the load being connectable across said common positive lead and said common negative lead;
   a plurality of batteries each with a positive and a negative battery terminal, each for supplying direct current power;
   a unidirectional current conducting element connected between each respective positive battery terminal and said common positive lead, to permit current to flow from each said positive battery terminal to said common positive lead;
   an input terminal associated with each said battery;
   a plurality of switches, each switch connected to a respective negative battery terminal, each such switch providing a connection between the respective negative battery terminal and alternately the respective input terminal or directly to said common negative lead;
   a direct electrical connection from each positive battery terminal but one to the input terminal associated with another of said batteries, each such input terminal being connected only to one said positive battery terminal, there being one input terminal associated with one battery and one positive battery terminal of another battery which are not so connected;
   an additional battery having a positive terminal and a negative terminal, the negative terminal of said additional battery being connected directly to said common negative lead and the positive terminal of said additional battery being connected directly to said one input terminal;
   a further unidirectional current conducting element connected between the positive terminal of said additional battery and said positive common lead to permit current to flow only from said additional battery to said common positive lead;
   selective switch closing means for closing in sequence various combinations of said switches to provide a series of different connections of said batteries ranging from a completely parallel connection to a completely series connection to provide a range of voltages across the load while maintaining a substantially uniform current drain from each said battery; and
   a short circuit means for providing a direct electrical connection between said one positive battery terminal and said common positive lead only when each said switch is operative to provide an electrical connection between a respective negative battery terminal and a respective input terminal.

2. A battery interconnection circuit for applying different voltages from a plurality of batteries across a load while maintaining substantially uniform current drain from the batteries, comprising, in combination:
   a common positive lead and a common negative lead with the load being connectable across said common positive lead and said common negative lead;
   a plurality of batteries each with a positive and a negative battery terminal, each for supplying direct current power;
   a unidirectional current conducting element connected between each respective positive battery terminal and said common positive lead, to permit current to flow from each said positive battery terminal to said common positive lead;
   an input terminal associated with each said battery;
   a plurality of switches, each switch connected to a respective negative battery terminal, each such switch providing a connection between the respective negative battery terminal and alternately the respective input terminal or directly to said common negative lead;
   a direct electrical connection from each positive battery terminal but one to the input terminal associated with another of said batteries, each such input terminal being connected only to one said positive battery terminal, there being one input terminal associated with one battery and one positive battery terminal of another battery which are not so connected;
   an additional battery having a positive terminal and a negative terminal, the negative terminal of said additional battery being connected directly to said common negative lead and the positive terminal of said additional battery being connected directly to said one input terminal;
   a further unidirectional current conducting element connected between the positive terminal of said additional battery and said positive common lead to permit current to flow only from said additional battery to said common positive lead;
   selective switch closing means for closing in sequence various combinations of said switches to provide a series of different connections of said batteries ranging from a completely parallel connection to a completely series connection to provide a range of voltages across the load while maintaining a substantially uniform current drain from each said battery, said switch closing means comprising a rotary cam for engaging each said switch, said cam being operative to control the sequence of switch closures as the cam is rotated; and
   each said switch comprising a microswitch controlled by said cam, each said microswitch being series connected with a relay coil, each said relay coil being powered by a unique one of said plurality of batteries, each said relay coil providing motive power to control a respective relay switch for providing the connection between the respective negative battery terminal and alternatively the respective input terminal or said common negative lead.

3. A battery interconnection circuit for applying different voltages from a plurality of batteries across a load while maintaining substantially uniform current drain from the batteries, comprising: in combination:
 a common positive lead and a common negative lead with the load being connectable across said common positive lead and said common negative lead;
 a plurality of batteries each with a positive and a negative battery terminal, each for supplying direct current power;
 a unidirectional current conducting element connected between each respective positive battery terminal and said common positive lead, to permit current to flow from each said positive battery terminal to said common positive lead;
 an input terminal associated with each said battery;
 a plurality of switches, each switch connected to a respective negative battery terminal, each such switch providing a connection between the respective negative battery terminal and alternately the respective input terminal or directly to said common negative lead;
 a direct electrical connection from each positive battery terminal but one to the input terminal associated with another of said batteries, each such input terminal being connected only to one said positive battery terminal, there being one input terminal associated with one battery and one positive battery terminal of another battery which are not so connected;
 an additional battery having a positive terminal and a negative terminal, the negative terminal of said additional battery being connected directly to said common negative lead and the positive terminal of said additional battery being connected directly to said one input terminal;
 a further unidirectional current conducting element connected between the positive terminal of said additional battery and said positive common lead to permit current to flow only from said additional battery to said common positive lead;
 selective switch closing means for closing in sequence various combinations of said switches to provide a series of different connections of said batteries ranging from a completely parallel connection to a completely series connection to provide a range of voltages across the load while maintaining a substantially uniform current drain from each said battery;
 a battery charger with a positive and a negative charger terminal, said negative charger terminal being connected directly to said common negative lead;
 a plurality of run/charge switches, each associated with one said switch, each said run/charge switch providing a connection between an associated switch and said common lead when said run/charge switch is in its run position and providing a connection between an associated switch and the positive battery terminal of one of said batteries when said run/charge switch is in its charge position; and
 a further run/charge switch for providing a connection between said one positive battery terminal and said positive charger terminal when said further run/charge switch is in its charge position, each of said plurality of run/charge switches and said further run/charge switch being simultaneously operable so that all run/charge switches are either in their run position or their charge position.

4. A battery interconnection circuit for applying different voltages from a plurality of batteries across a load while maintaining substantially uniform current drain from all the batteries, comprising, in combination:
 a common positive lead and a common negative lead with the load being connectable across said common positive lead and said common negative lead;
 a plurality of batteries, each with a positive and a negative battery terminal, each for supplying direct current power;
 a unidirectional current-conducting element connected between each respective positive battery terminal and said common positive lead, to permit current to flow from each said positive battery terminal to said common positive lead;
 a plurality of break-before-make relay switches, each said relay switch being associated with one of said plurality of batteries, each said relay switch including four contacts and a contactor for alternately connecting pairs of said contacts, one contact in each pair of contacts being electrically connected to the negative battery terminal of the associated battery, the remaining contact of one pair comprising an input terminal associated with a battery and the other remaining contact of the other pair of contacts being connected directly to the common negative lead, each said relay switch including a relay coil series-connected with a microswitch between the associated positive and negative battery terminal, each said microswitch being operative to control the electrical connection through said relay switch;
 a direct electrical connection from each positive battery terminal but one to the input terminal associated with another of said batteries, each such input terminal being connected only to one said positive battery terminal, there being one input terminal associated with one battery and one positive battery terminal of another battery which are not so connected;
 an additional battery having a positive terminal and a negative terminal, the negative terminal of said additional battery being connected directly to the common negative lead and the positive terminal of said additional battery being connected directly to said one input terminal;
 a further unidirectional current-conducting element connected between the positive terminal of said additional battery and said positive common lead to permit current to flow from said additional battery to said common positive lead;
 selective microswitch closing means for closing in sequence various combinations of said microswitches to provide a series of different connections of said batteries ranging from a completely parallel connection to a completely series connection to provide a range of voltages across the load while maintaining a substantially uniform current drain from each said battery; and short circuit means for providing a direct electrical connection between said one positive battery terminal and said common positive lead only when each said relay switch is operative to provide an electrical connection between a respective negative battery terminal and a respective input terminal.

5. A battery interconnection circuit for applying different voltages from a plurality of batteries across a load while maintaining substantially uniform current drain from all the batteries, comprising, in combination:

a common positive lead and a common negative lead with the load being connectable across said common positive lead and said common negative lead;

a plurality of batteries, each with a positive and a negative battery terminal, each for supplying direct current power;

a unidirectional current-conducting element connected between each respective positive battery terminal and said common positive lead, to permit current to flow from each said positive battery terminal to said common positive lead;

a plurality of break-before-make relay switches each said relay switch being associated with one of said plurality of batteries, each said relay switch including four contacts and a contactor for alternately connecting pairs of said contacts, one contact in each pair of contacts being electrically connected to the negative battery terminal of the associated battery, the remaining contact of one pair comprising an input terminal associated with a battery and the other remaining contact of the other pair of contacts being connected directly to the common negative lead, each said relay switch including a relay coil series-connected with a microswitch between the associated positive and negative battery terminal, each said microswitch being operative to control the electrical connection through said relay switch;

a direct electrical connection from each positive battery terminal but one to the input terminal associated with another of said batteries, each such input terminal being connected only to one said positive battery terminal, there being one input terminal associated with one battery and one positive battery terminal of another battery which are not so connected;

an additional battery having a positive terminal and a negative terminal, the negative terminal of said additional battery being connected directly to the common negative lead and the positive terminal of said additional battery being connected directly to said one input terminal;

a further unidirectional current-conducting element connected between the positive terminal of said additional battery and said positive common lead to permit current to flow from said additional battery to said common positive lead;

selective microswitch closing means for closing in sequence various combinations of said microswitches to provide a series of different connections of said batteries ranging from a completely parallel connection to a completely series connection to provide a range of voltages across the load while maintaining a substantially uniform current drain from each said battery;

a battery charger with a positive and a negative charger terminal, said negative charger terminal being connected directly to said common negative lead;

a plurality of run/charge switches, each associated with one said relay switch, each said run/charge switch providing an electrical connection between the said other remaining contact and said common negative lead when the run/charge switch is in its run position and providing an electrical connection between said other remaining contact and the positive battery terminal of another battery when said run/charge switch is in its charge position; and a further run/charge switch for providing a connection between said one positive battery terminal and said positive charger terminal when said additional run/charge switch is in its charge position, all of said run/charge switches being simultaneously operative in either their run or their charge position.

* * * * *